(12) United States Patent
Jeong et al.

(10) Patent No.: US 7,218,671 B2
(45) Date of Patent: May 15, 2007

(54) EQUALIZER FOR A VSB RECEIVER ENABLING EQUALIZATIONS USING SEGMENT SYNCHRONIZATION INFORMATION

(75) Inventors: Jin-hee Jeong, Seoul (KR); Jae-hyon Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 796 days.

(21) Appl. No.: 10/404,046

(22) Filed: Apr. 2, 2003

(65) Prior Publication Data

US 2003/0223519 A1 Dec. 4, 2003

(30) Foreign Application Priority Data

May 28, 2002 (KR) ................ 2002-29696

(51) Int. Cl.
*H03H 7/30* (2006.01)
*H03H 7/40* (2006.01)
*H03K 5/159* (2006.01)

(52) U.S. Cl. .................. 375/229; 375/230; 375/231; 375/232; 375/233; 348/729

(58) Field of Classification Search ............... 375/229, 375/230, 231, 232, 233; 348/729
See application file for complete search history.

(56) References Cited

U.S. PATENT DOCUMENTS 6,081,301 A 6/2000 Limberg 6,693,958 B1* 2/2004 Wang et al. ................ 375/232

FOREIGN PATENT DOCUMENTS

CN 1258166 6/2000

OTHER PUBLICATIONS

VSB modem subsystem design for Grand Alliance digital television receivers, Bretl, W.; Sgrignoli, G.; Snopko, P.; Consumer Electronics, IEEE Transactions on vol. 41, Issue 3, Aug. 1995 pp. 773-786, Digital Object Identifier 10.1109/30.468013.*
Office Action issued Dec. 10, 2004 from the Chinese Patent Office with respect to corresponding Chinese Patent Application No. 03137847.1, filed May 26, 2003.

* cited by examiner

*Primary Examiner*—Chieh M. Fan
*Assistant Examiner*—Ted M. Wang
(74) *Attorney, Agent, or Firm*—Staas & Halsey LLP

(57) ABSTRACT

An equalizer for a VSB receiver, which enables equalizations using segment synchronization information, has an extraction unit extracting the segment synchronization information included in the VSB broadcast signal, a storage unit storing the extracted segment synchronization information, and an equalization unit equalizing the VSB broadcast signal based on the segment synchronization information stored in the storage unit. The storage unit stores the segment synchronization information extracted from the extraction unit by field unit or by unit of N data segments within the field according to a channel state. More stable equalizations can be carried out in channel environment changes by storing segment synchronization information by the predetermined number of data segments and equalizing data within a corresponding data segment in a training mode while using the segment synchronization information every matching number of data segments.

12 Claims, 8 Drawing Sheets

US 7,218,671 B2

EQUALIZER FOR A VSB RECEIVER ENABLING EQUALIZATIONS USING SEGMENT SYNCHRONIZATION INFORMATION

CROSS-REFERENCE TO RELATED APPLICATION

This application claims the benefit of Korean Application No. 2002-29696, filed May 28, 2002 in the Korean Intellectual Property Office, the disclosure of which is incorporated herein by reference.

BACKGROUND OF THE INVENTION

1. Field of the Invention

The present invention relates to an equalizer for a vestigial side-band (VSB) receiver, and more particularly, to an equalizer for a VSB receiver which compensates for VSB broadcast signal distortions occurring on transmission channels using field synchronization information which includes synchronization information on each field of a VSB broadcast signal and segment synchronization information including synchronization information on each data segment of the field.

2. Description of the Related Art

For broadcast signal transmission modes for digital broadcast implementations, there are currently a vestigial sideband (VSB) modulation mode and a coded orthogonal frequency division multiplexing (COFDM) modulation mode. The VSB modulation mode is a mode for broadcast signal transmissions in which a broadcast signal is transmitted on a single carrier. The COFDM modulation mode is a mode for broadcast signal transmissions in which a broadcast signal is transmitted through multiple transmission channels with multiple divisions of the broadcast signal. The VSB modulation mode is the digital broadcast transmission mode chosen by Korea, the United States of America, and so on. The COFDM modulation mode is the digital broadcast transmission mode chosen by Europe.

FIG. 1 is a block diagram schematically showing a conventional VSB transmitter. The VSB transmitter has a data inserter 11, an encoder 12, a multiplexer (MUX) 13, a pilot inserter 14, a modulator 15, and an RF-converter 16. The data inserter 11 interleaves the data to be transmitted to a receiver (shown in FIG. 2) according to a predetermined transforming method. The encoder 12 encodes the data interleaved in the data inserter 11. At this time, a generally used encoding method in the encoder 12 is the trellis encoding method.

The MUX 13 inserts field synchronization information F and segment synchronization information S in the encoded data according to a set method. The field synchronization information F includes mode information and the like together with field synchronization information. The segment synchronization information S includes synchronization information of each data segment within a field. Such field synchronization information F and segment synchronization information S are used when restoring data at the receiver.

The pilot inserter 14 inserts a pilot in a VSB broadcast signal including data, field synchronization information F, and segment synchronization information S output from the MUX 13. The modulator 15 applies the VSB modulation to the VSB broadcast signal which includes the pilot based on a set transmission mode. The RF-converter 16 high-frequency-modulates the VSB-modulated VSB broadcast signal for transmission to receivers through an antenna 18.

FIG. 2 is a block diagram for showing a general VSB receiver. The VSB receiver has a tuner 22, an IF amplifier 23, a synchronization detector 24, an offset restorer 25, an equalizer 26, a decoder 27, and a data extractor 28. The tuner 22 selects a desired bandwidth, based on a channel selection command, for the VSB broadcast signal transmitted to the VSB receiver and received at the antenna 21. The IF amplifier 23 IF-amplifies the received VSB broadcast signal of the desired bandwidth. The synchronization detector 24 converts the IF-amplified VSB broadcast signal into a digital format, and restores VSB broadcast signal carrier distortions occurring upon a channel selection operation of the tuner 22. The offset restorer 25 compensates for frequency, phase, and timing offsets as to the VSB broadcast signal which occur upon operations of the synchronization detector 24.

The equalizer 26 compensates channel distortions occurring at a transmission channel of the VSB broadcast signal output from the synchronization detector 24. The decoder 27 decodes data of the VSB broadcast equalized in the equalizer 26. The data extractor 28 carries out interleaving operations which combine data of a VSB broadcast signal interleaved in the VSB transmitter shown in FIG. 1.

FIG. 3 is a view showing a data frame structure of the VSB broadcast signal transmitted from the VSB transmitter shown in FIG. 1. Specifically, FIG. 3 shows one of the data frames of a VSB broadcast signal. One data frame is composed of two fields, a first field and a second field. Each field has 313 segments. The first and second fields each have the same kind of information, so only the first field is described as an example.

The first field is composed of data including a first field synchronization information F1, the segment synchronization information S, and Forward error correction (FEC), as error check information, which is encoded in the encoder 12. The first field synchronization information F1 includes synchronization information indicating a start of an input of the first field, and so on, and is composed of 828 symbols. The segment synchronization information includes synchronization information indicating a start of every segment, and so on, and each segment is composed of four symbols. A repetition period time is 77.3 μs per segment, and a repetition period time is 24.2 ms per field. Accordingly, a repetition period time of one data frame is 48.4 ms.

The equalizer 26 of a conventional VSB receiver uses a training sequence when equalizing data of the VSB broadcast signal so as to equalize the field synchronization information F included in a pre-set region of the field synchronization information F. Further, the equalizer 26 of the conventional VSB receiver uses the segment synchronization information S repeated at every segment to catch a start point of data included in a corresponding segment. Accordingly, the equalizer 26 of the conventional VSB receiver operates in training for equalizations while segment synchronizations are received.

However, the equalizer 26 of the conventional VSB receiver operates in a blind mode for equalizations while data of each segment is received. Accordingly, the equalizer 26 of the conventional VSB receiver, upon equalization operations, repeats the training and blind modes in one field at every segment. Therefore, the equalizer 26 of the conventional VSB receiver has a problem in frequent switching operations for equalization mode changes.

Further, the equalizer of the conventional VSB receiver has a problem in worsening its data equalization performance since the equalization is carried out in the blind mode when equalizing a section including data of each segment.

SUMMARY OF THE INVENTION

In order to solve the above and/or other problems, it is an aspect of the present invention to provide an equalizer for a VSB receiver which enhances an equalization performance of data of a VSB broadcast signal during equalization operations in a blind mode for a section including data of a segment section.

Additional aspects and advantages of the invention will be set forth in part in the description which follows and, in part, will be obvious from the description, or may be learned by practice of the invention.

In order to achieve the above and/or other aspects, an aspect of the present invention comprises an equalizer for a VSB receiver for use in compensating distortions of a VSB broadcast signal which occur in transmission channels and which include field synchronization information including synchronization information as to each field of the VSB broadcast signal and segment synchronization information including synchronization information of each data segment within the field, the equalizer including an extraction part to extract the segment synchronization information included in the VSB broadcast signal, a storage part to store the extracted segment synchronization information, and an equalization part to equalize the VSB broadcast signal based on the segment synchronization information stored in the storage part.

According to an aspect of the invention, the storage part stores, by field unit, the extracted segment synchronization information extracted by the extraction part, and, accordingly, the equalization part equalizes the VSB broadcast signal based on the stored segment synchronization information of the field unit stored in the storage part.

According to another aspect of the invention, if the stored segment synchronization information has a same number of symbols as a number of symbols of the data segment to be received out of the entire data segment symbols within the field, the equalization part equalizes, based on the segment synchronization information, the VSB broadcast signal including the data segment of symbols corresponding to the number of symbols of the stored segment synchronization information stored in the storage part.

According to a further aspect of the invention, the storage part stores the segment synchronization information extracted by the extraction part by unit of N data segments within the field, and, accordingly, the equalization part equalizes, based on the segment synchronization information, the VSB broadcast signal including a same number of symbols as a number of symbols of the segment synchronization information corresponding to the N data segments out of the N data segments.

According to a still further aspect of the invention, N is one of 3, 4, and 5.

According to a yet still further aspect of the invention, the segment synchronization information of the data segment includes four symbols per data segment, the number of the data segments constructing the field is 312, and the number of the segment synchronization information of the data segments within the field is 1248.

According to an additional aspect of the invention, if the storage part stores the segment synchronization information by field unit, the entire number of symbols of the segment synchronization information which are stored in the storage part is 1244.

According to a still additional aspect of the invention, if the storage part stores the segment synchronization information by unit of the N data segments, the entire number of symbols of the segment synchronization information is 1248.

According to yet another aspect of the invention, if a transmission channel state of the VSB broadcast signal is dynamic, the storage part stores the segment synchronization information by unit of the N data segments, and, if the transmission channel state of the VSB broadcast signal is static, the storage part stores the segment synchronization information by field unit.

BRIEF DESCRIPTION OF THE DRAWINGS

The above and/or other aspects and other features of the present invention will become more apparent and more readily appreciated by describing in detail embodiments thereof with reference to the accompanying drawings, in which.

DETAILED DESCRIPTION OF THE EMBODIMENTS

Figure 1:
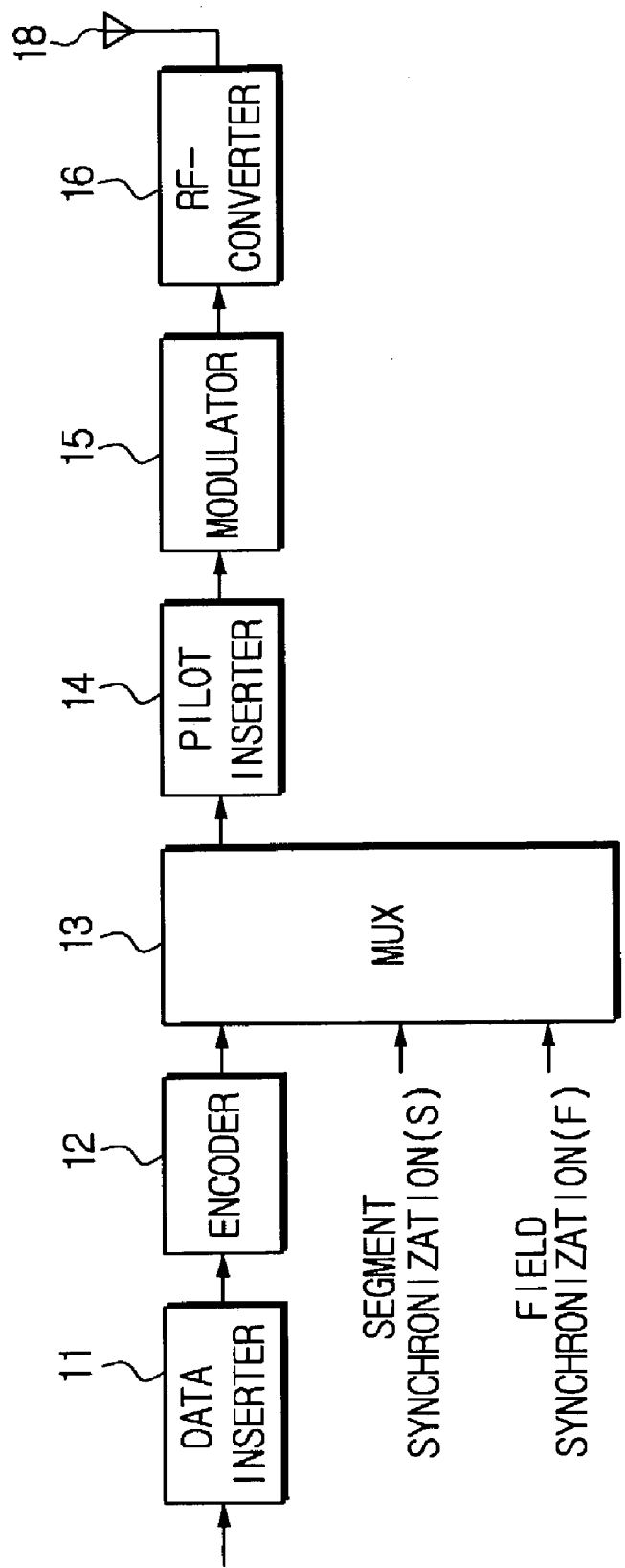
FIG. 1 is a block diagram for showing a general VSB transmitter.
Figure 2:
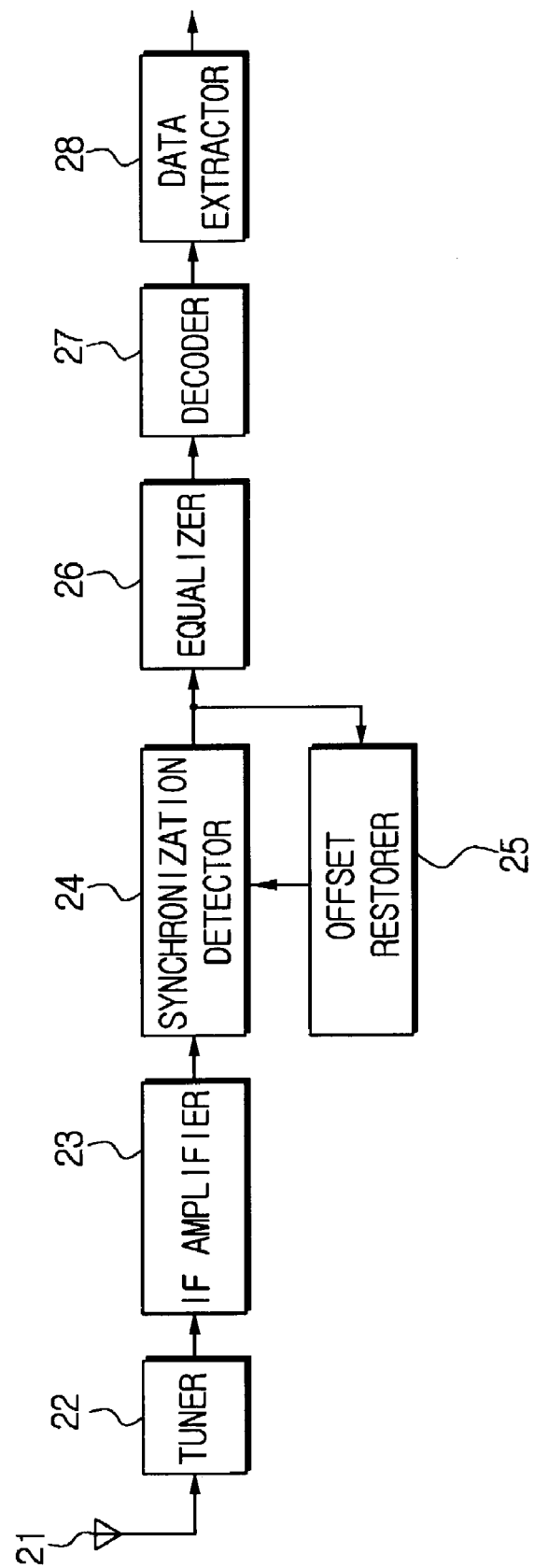
FIG. 2 is a block diagram for showing a general VSB receiver.
Figure 3:
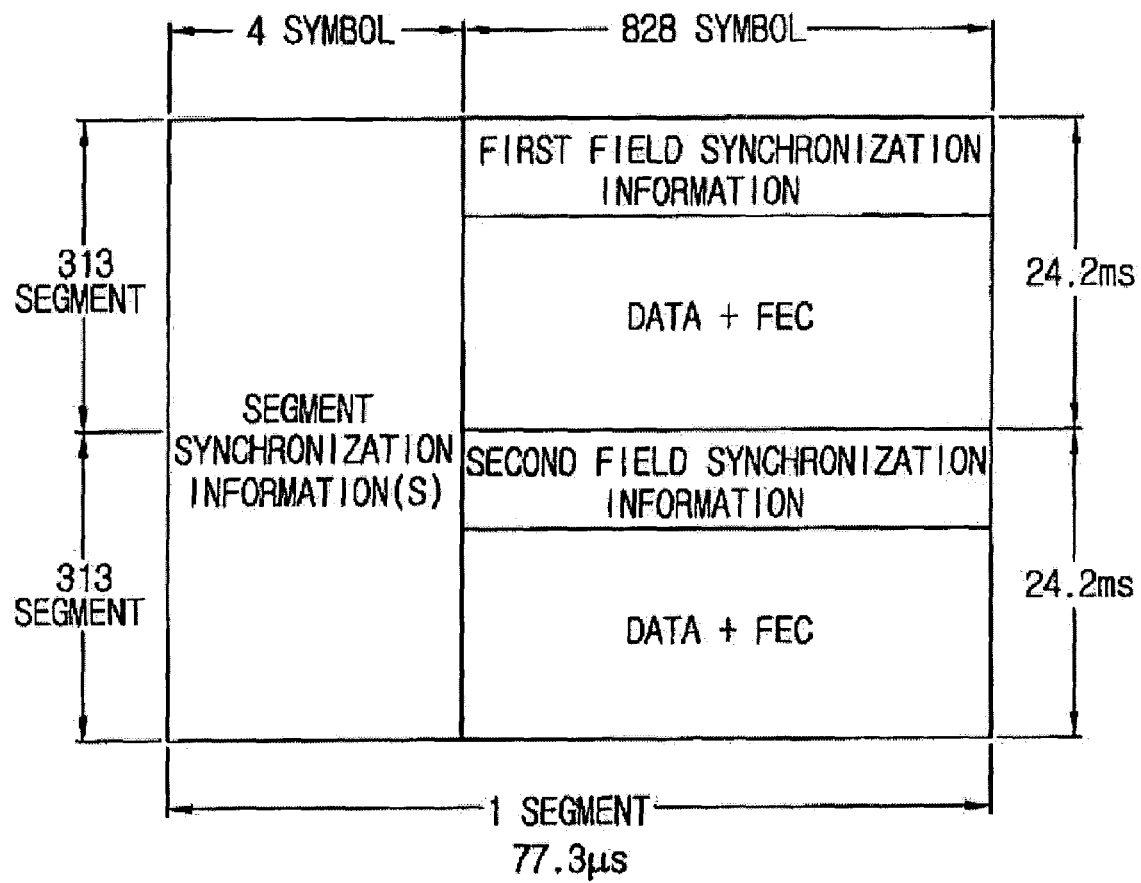
FIG. 3 is a view showing a structure of a data frame of a VSB broadcast signal.

Hereinafter, the present invention is described in detail, examples of which are illustrated with reference to the accompanying drawings, wherein like reference numerals refer to the like elements throughout. The embodiments are described below in order to explain the present invention by referring to the figures.

Figure 4:
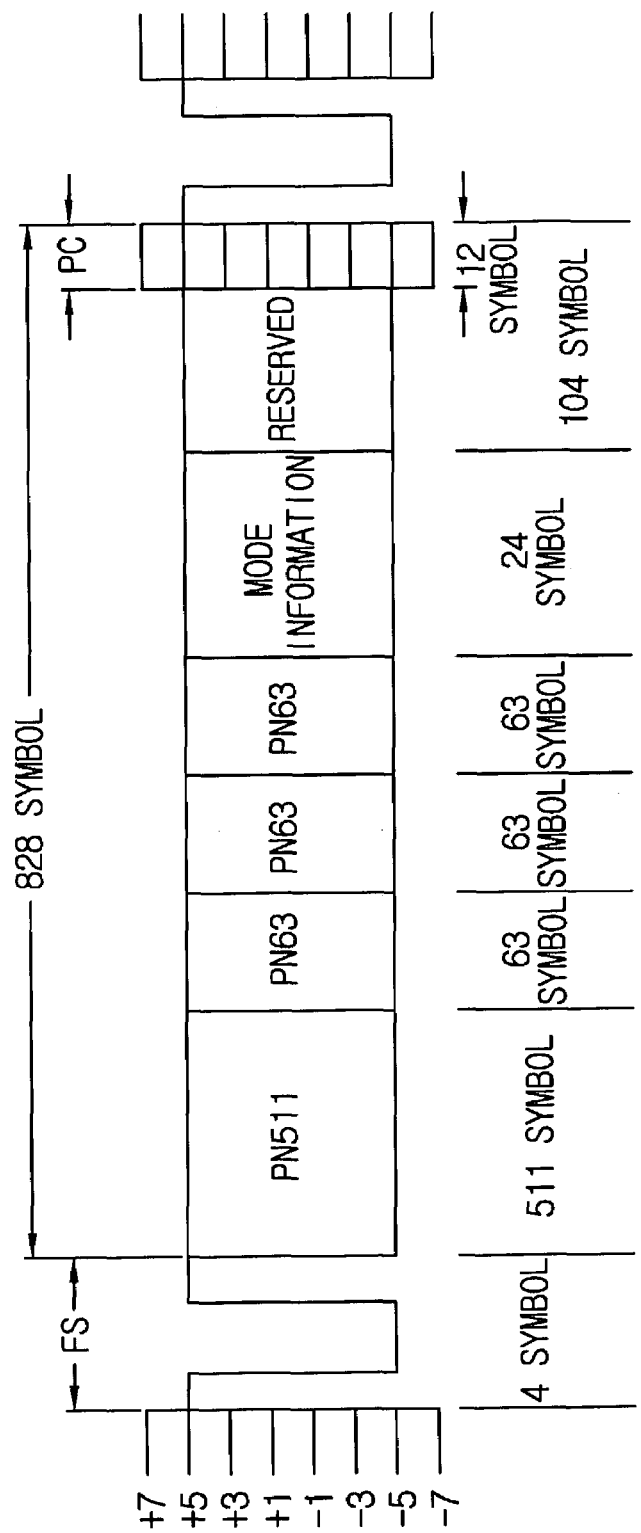
FIG. 4 is a view showing a structure of field synchronization information of 8VSB out of a VSB broadcast signal.

Prior to the description on an equalizer of a VSB receiver according to an embodiment of the present invention, structures of field synchronization information and segment synchronization information of a VSB broadcast signal are briefly described. FIG. 4 is a view showing a structure of field synchronization information of 8VSB out of a VSB broadcast signal. For reference, the field synchronization information shown has level values prior to a pilot insertion. The field synchronization information includes field start information FS, which is start information as to the field synchronization information, PN511 used for field start information, three PN63's, mode information indicating a VSB mode, a reserved section which is unused, and precode information PC. The PN511 and PN63's are information coded in a pseudo-random sequence. As shown, the field start information FS is segment synchronization information as to the field synchronization information.

The field start information FS is composed of four symbols. The PN511 is composed of 511 symbols. The three PN63 are each composed of 63 symbols. The mode information is composed of 24 symbols. The reserved section is composed of 104 symbols. The precode information PC is included in the reserved section and is composed of 12 symbols.

Figure 5:
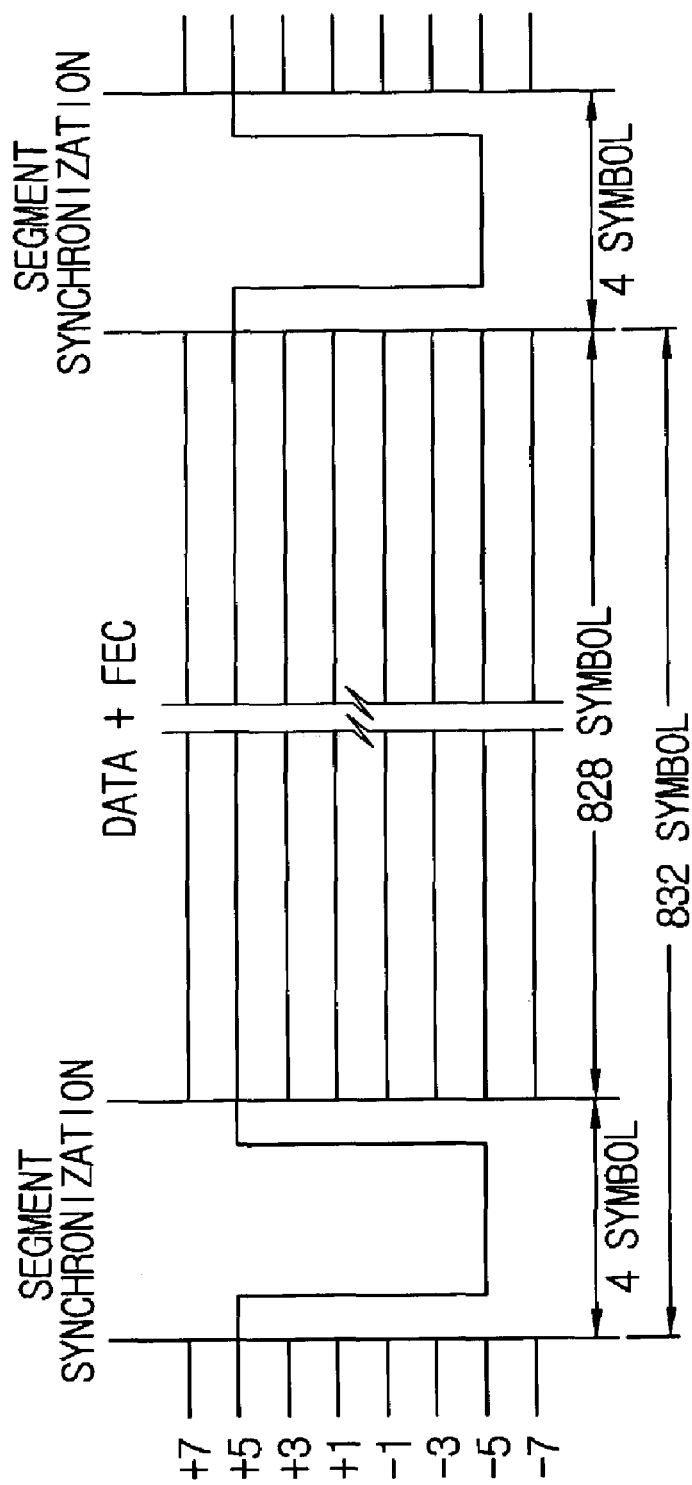
FIG. 5 is a view showing a structure of a data segment of 8VSB out of a VSB broadcast signal.

FIG. 5 is a view showing a structure of a data segment of 8VSB out of a VSB broadcast signal. For reference, the shown data segment shown has level values prior to a pilot insertion. The data segment is composed of segment synchronization information and data including FEC. The segment synchronization information is the start information of a data segment and is composed of four symbols. The data is substantially data which is required in a VSB receiver and is composed of 828 symbols. Accordingly, one data segment is composed of 832 symbols.

Figure 6:
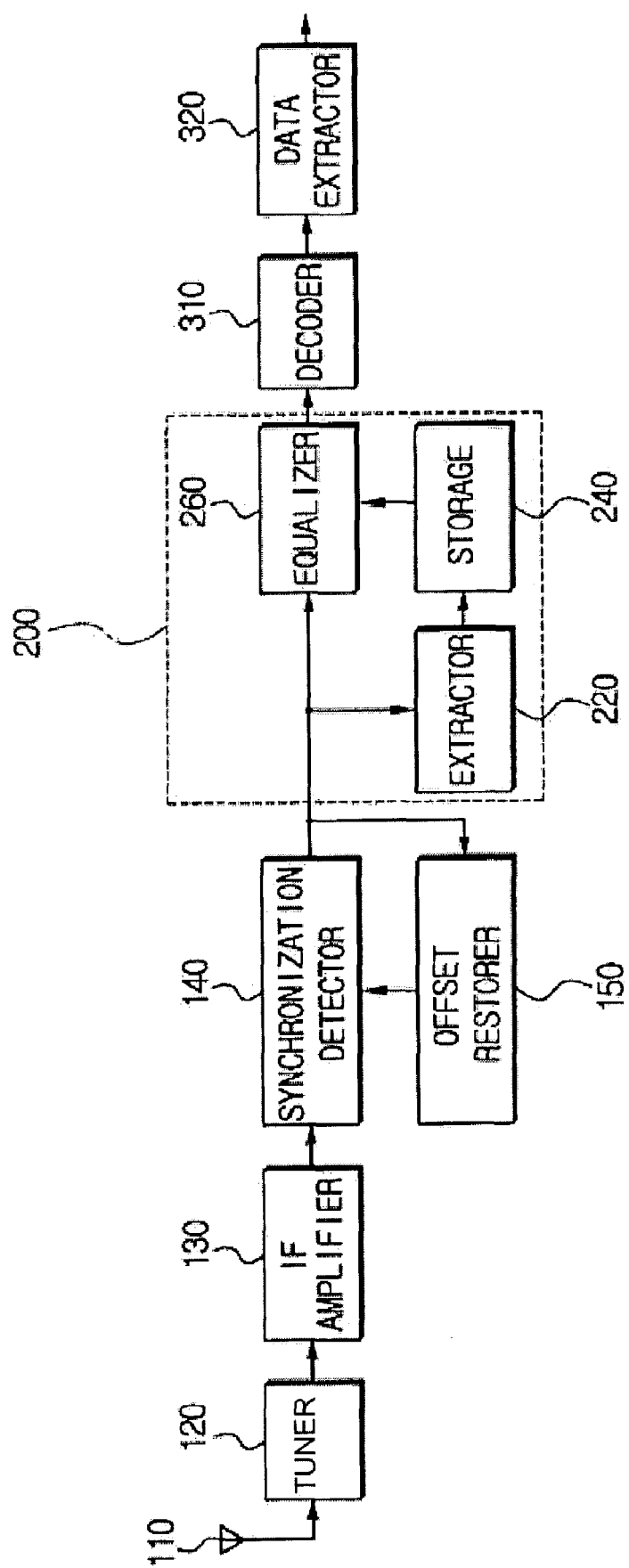
FIG. 6 is a block diagram for a VSB receiver having an equalizer for equalizations using segment synchronization information according to an embodiment of the present invention.

FIG. 6 is a block diagram showing a VSB receiver having an equalization performance-enhanced equalizer according to an embodiment of the present invention. The VSB receiver has a tuner 120, an IF amplifier 130, a synchronization detector 140, an offset restorer 150, an equalizer 200, a decoder 310, and a data extractor 320. The tuner 120 selects a matching bandwidth, based on a channel selection command, for a VSB broadcast signal which is transmitted from a VSB transmitter (not shown) and received at an antenna 110. The IF amplifier 130 IF-amplifies the received VSB broadcast signal of the selected bandwidth. The synchronization detector 140 converts the IF-amplified VSB broadcast signal into a digital format, and restores VSB broadcast signal carrier distortions occurring upon a selection operation. The offset restorer 150 compensates frequency, phase and timing offsets as to the VSB broadcast signal which occur due to the operations of the synchronization detector 140.

The equalizer 200 compensates channel distortions occurring on a transmission channel of the VSB broadcast output from the synchronization detector 140 using the segment synchronization information of the VSB broadcast signal. The decoder 310 decodes data of the equalized VSB broadcast signal equalized in the equalizer 260. The data extractor 320 carries out de-interleaving operations which combine data of the VSB broadcast signal interleaved in a VSB transmitter (not shown).

The equalizer 200 of the present embodiment has an extractor 220, a storage 240, and an equalizer 260. The extractor 220 extracts the segment synchronization information from the VSB broadcast signal. The storage 240 stores the extracted segment synchronization information extracted from the extractor 220 per set unit. The equalizer 260, when equalizing the data in a data segment of the VSB broadcast signal, compares the data with a set reference signal for an equalization of the data using the stored segment synchronization information stored in the storage 240.

According to one aspect, the storage 240 stores, by field unit, the segment synchronization information extracted from the extractor 220. According to another aspect, the storage 240 stores the segment synchronization information extracted from the extractor 220 by unit of the predetermined number of data segments.

Accordingly, when the segment synchronization information is stored in the storage 240 by field unit, the equalizer 260 matches the stored segment synchronization information stored in the storage 240 with data of the VSB broadcast signal received when a number of symbols of the segment synchronization information is the same as a number of the data segments to be received for a corresponding field. That is, the equalizer 200 stores the segment synchronization information as to every field and, when equalizing the data of the VSB broadcast signal, uses the stored segment synchronization information as a training sequence with operations in a training mode.

When the segment synchronization information is stored in the storage 240 by unit of the predetermined number of data segments, the equalizer 260 matches the data of the VSB broadcast signal corresponding to the data segments within a set number which are received when a number of symbols of the segment synchronization information is the same as the number of symbols of the data segments with the stored segment synchronization information corresponding to the number of data segments stored in the storage 240. That is, the equalizer 200 uses as a training sequence the stored segment synchronization information stored in the storage 240 at every corresponding number of data segments, and equalizes in the training mode the data segments of the VSB broadcast signal corresponding to the number of symbols of the stored segment synchronization information stored in the storage 240. Such a method enables an improved equalization performance to be obtained as compared to a method in which a channel status of the VSB broadcast signal is dynamic.

Figure 7:
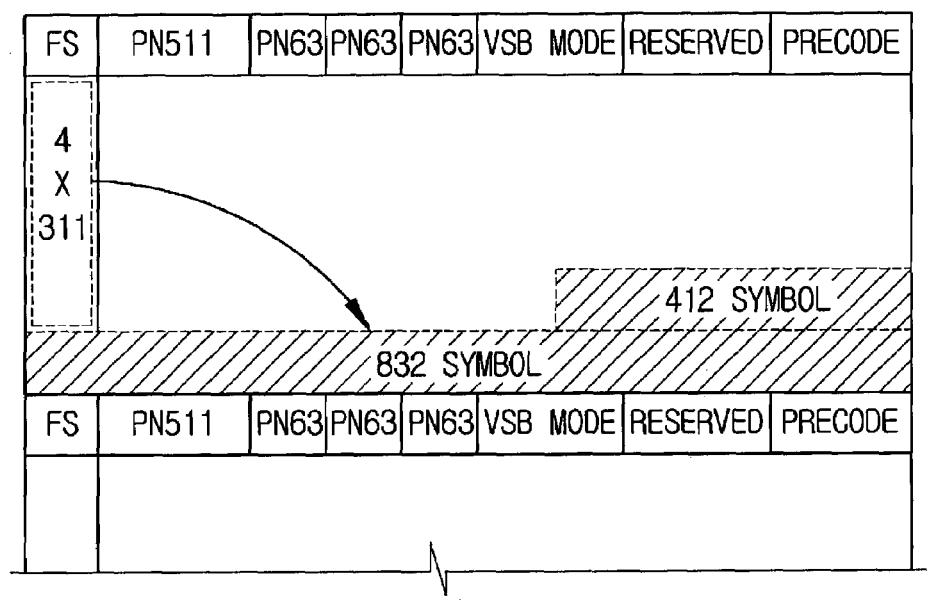
FIG. 7 is a view explaining the storage of segment synchronization information into a storage of FIG. 6 by field unit and equalization operations of an equalizer of FIG. 6 accordingly.

FIG. 7 is a view explaining the storage of the segment synchronization information in the storage 240 by field unit and the equalization operations of the equalizer 260 accordingly. The storage 240 sequentially stores the segment synchronization information extracted from the extractor 220. The equalizer 260, when the number of the symbols of the stored segment synchronization information stored in the storage 240 is the same as that of the data segments to be received in a matching field, matches the symbols of data segments received thereafter to symbols of the stored segment synchronization information stored in the storage 240 to carry out equalizations in the training mode. Accordingly, the storage 240, in case of an 8VSB, stores the segment synchronization information of 1244 symbols extracted with respect to 311 data segments out of 312 data segments. The equalizer 260 carries out the equalizations in the training mode with the stored segment synchronization information as to the 1244 symbols out of the data segments.

Figure 8:
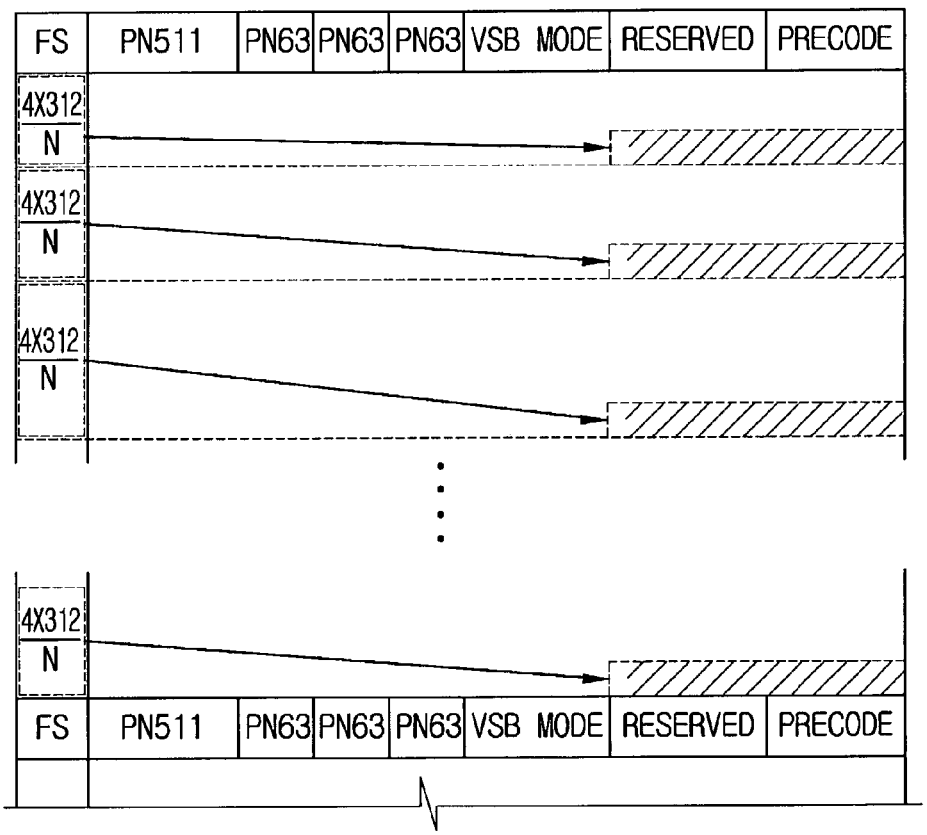
FIG. 8 is a view explaining the storage of segment synchronization information in the storage of FIG. 6 by unit of the matching number of data segments and, accordingly, equalization operations of the equalizer of FIG. 6.

FIG. 8 is a view explaining the storage segment synchronization information in the storage 240 by unit of the matching number of data segments and, accordingly, the equalization operations of the equalizer 260. In FIG. 8, the storage 240 groups 312 data segments into N data segments and stores the segment synchronization information corresponding to the N data segments. Accordingly, the storage 240 stores the number of symbols occurring from a division of 1248 segment synchronization information symbols by N, respectively. The equalizer 260 equalizes in the training mode the same number of data segments as the number of the stored segment synchronization information symbols within the data segment stored in the storage 240 once every N data segments. As shown, the N for dividing data segments is preferably 3, 4, or 5. That is, it is preferable to divide data segments into any one unit of 3, 4, and 5 segments. However, it is understood that other values for N can be used.

Preferably, the storage 240, if a transmission channel state for a VSB broadcast signal is a dynamic state varying with time, stores the segment information by unit of N data segments. Further, the storage 240, if the transmission channel state for a VSB broadcast signal is a static state not varying with time, stores the segment synchronization information by field unit.

Accordingly, using the segment synchronization information as a training sequence every N data segments for equalizations enables the VSB broadcast signal to be stably equalized if channel environments are dynamic.

With the present invention, using the extracted segment synchronization information as a training sequence when equalizing data within data segments enables the VSB broadcast signal to be more precisely equalized.

Further, more stable equalizations can be carried out in channel environment changes by storing the segment synchronization information by the predetermined number of data segments and equalizing the data within a corresponding data segment in a training mode while using the segment synchronization information every matching number of data segments.

Although embodiments of the present invention have has been described, it will be understood by those skilled in the art that the present invention should not be limited to the described embodiments, but various changes and modifications can be made within the spirit and scope of the present invention as defined by the accompanying claims and equivalents thereof.

What is claimed is:

1. An equalizer for a vestigial side-band (VSB) receiver for use in compensating distortions of a VSB broadcast signal which occurs in transmission channels using field synchronization information including synchronization information as to each field of the VSB broadcast signal and segment synchronization information including synchronization information of each data segment within the field, the equalizer comprising:
    an extraction unit to extract the segment synchronization information included in the VSB broadcast signal;
    a storage unit to store the extracted segment synchronization information; and
    an equalization unit to equalize the VSB broadcast signal based on the stored segment synchronization information,
    wherein
        the storage unit stores, by field unit, the extracted segment synchronization information, and the equalization unit uses the stored segment synchronization information of the field unit to equalize the VSB broadcast signal, and
        when the stored segment synchronization information has a same number as a number of symbols of the data segment to be received out of the entire data segment symbols within the field, the equalization unit equalizes, based on the stored segment synchronization information, the VSB broadcast signal including the data segment having the symbols corresponding to the number of symbols as the stored segment synchronization information.

2. The equalizer as claimed in claim 1, wherein the segment synchronization information of the data segment includes four symbols per data segment.

3. The equalizer as claimed in claim 2, wherein a number of the data segments making up the field is 312.

4. The equalizer as claimed in claim 3, wherein a number of the segment synchronization information of the data segments within the field is 1248.

5. The equalizer as claimed in claim 4, wherein, when the storage unit stores the extracted segment synchronization information by the field unit, the number of symbols of the stored segment synchronization information is 1244.

6. The equalizer as claimed in claim 5, wherein, when the storage unit stores the extracted segment synchronization information by unit of the N data segments, the number of symbols of the stored segment synchronization information is 1248.

7. The equalizer as claimed in claim 6, wherein, when a transmission channel state of the VSB broadcast signal is dynamic, the storage unit stores the segment synchronization information by unit of the N data segments.

8. The equalizer as claimed in claim 7, wherein, when the transmission channel state of the VSB broadcast signal is static, the storage unit stores the segment synchronization information by field unit.

9. An equalizer for a vestigial side-band (VSB) receiver for use in compensating distortions of a VSB broadcast signal which occurs in transmission channels using field synchronization information including synchronization information as to each field of the VSB broadcast signal and segment synchronization information including synchronization information of each data segment within the field, the equalizer comprising:
    an extraction unit to extract the segment synchronization information included in the VSB broadcast signal;
    a storage unit to store the extracted segment synchronization information; and
    an equalization unit to equalize the VSB broadcast signal based on the stored segment synchronization information,
    wherein the storage unit stores the extracted segment synchronization information by unit of N data segments within the field, and the equalization unit uses the stored segment synchronization information to equalize the VSB broadcast signal having a same number of symbols as a number of symbols of the segment synchronization information corresponding to the N data segments out of the N data segments.

10. The equalizer as claimed in claim 9, wherein N is one of 3, 4, and 5.

11. A receiver to receive a vestigial side-band (VSB) broadcast signal which occurs in transmission channels, the VSB broadcast signal having fields, and data segments in each field, field synchronization information including synchronization information as to each field, and segment synchronization information including synchronization information of each data segment within the field, the receiver comprising:
    a tuner to select and receive the VSB broadcast signal;
    an IF amplifier to IF amplify the received VSB broadcast signal;
    a synchronization detector to convert the IF amplified VSB broadcast signal to a digital signal and to restore VSB broadcast signal carrier distortions;
    an offset restorer to detect and compensate frequency, phase, and/or timing offsets occurring as the synchronization detector converts the IF amplified VSB broadcast signal;
    an equalizer which compensates channel distortions of the converted VSB broadcast signal according to a stored segment synchronization information; and
    a decoder which decodes the equalized VSB broadcast signal,
    wherein
        the equalizer selectively utilizes the stored segment synchronization information and the received segment synchronization information in the converted VSB broadcast signal according to a correspondence between the stored segment synchronization information and the received segment synchronization information, when the equalizer detects that the stored segment synchronization information corresponds to the received segment synchronization information in the converted VSB broadcast signal, the equalizer uses the stored segment synchronization information to equalize the converted VSB broadcast signal, when the VSB broadcast signal is in a static state, the stored the segment synchronization information is the segment synchronization information for one field, and, when the equalizer detects a new field in the converted VSB broadcast signal, the equalizer uses the stored segment synchronization information, and when the VSB broadcast signal is in a dynamic state, the stored the segment synchronization information is the segment synchronization information for a set number of symbols, and, when the equalizer detects a receipt of the set number of symbols in the converted VSB broadcast signal, the equalizer uses the stored segment synchronization information for the set number of symbols in the segment being received.

12. The receiver of claim 11, further comprising:

an extractor which extracts the segment synchronization information from the converted VSB broadcast signal; and a storage unit which stores the extracted segment synchronization information, wherein the equalizer selectively utilizes the stored segment synchronization information retrieved from the storage unit.

* * * * *